FIG. 2

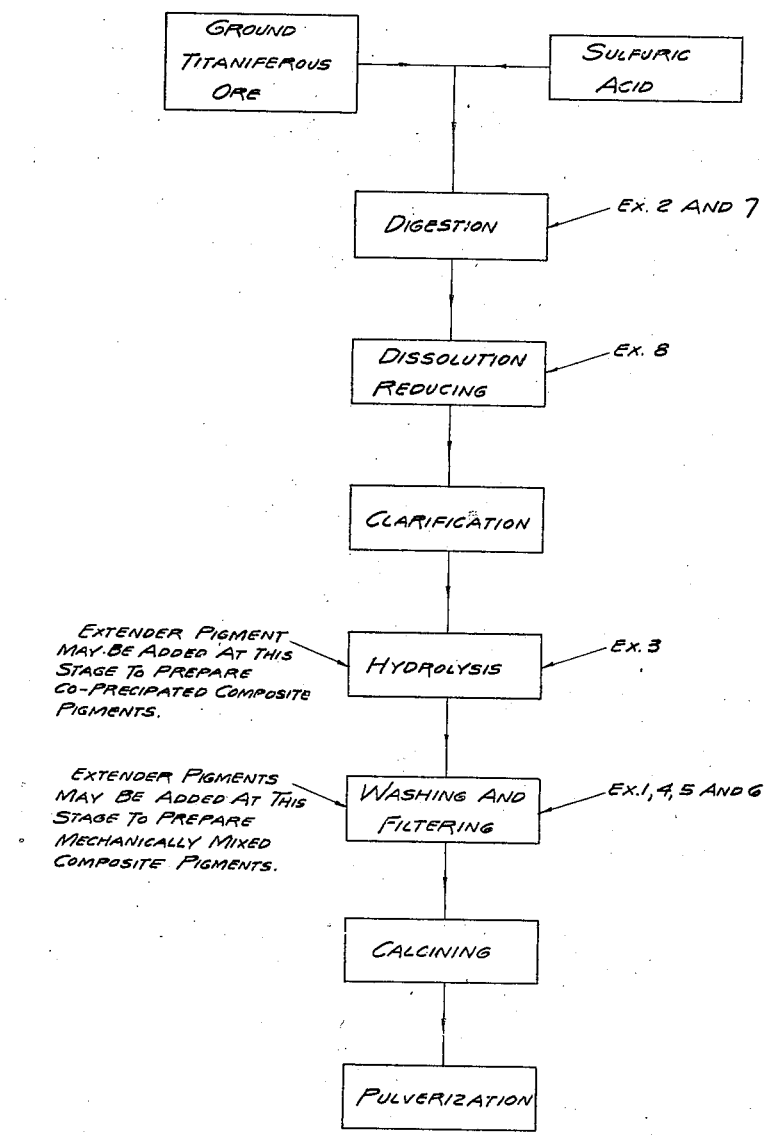

TABLE A

| Pigment No. | Agent | Compound Used | Quantity % Agent on $TiO_2$ | Group | Purple Blue 4560 | Blue Green 4930 | Green 5480 | Yellow 5860 | Red 6560 | Average |
|---|---|---|---|---|---|---|---|---|---|---|
| | | | | | Ångström Units | | | | | |
| 1 | None | — | — | — | 92.9 | 93.3 | 93.3 | 93.3 | 93.5 | 93.26 |
| 2 | Yt | $Yt(NO_3)_3$ | .00232 | II | 94.7 | 94.7 | 94.4 | 94.2 | 93.8 | 94.36 |
| 3 | Mo | $(NH_4)_2MoO_4$ | .00667 | I | 94.4 | 94.2 | 94.2 | 94.0 | 93.8 | 94.12 |
| 4 | Pd | $PdCl_2$ | .005 | II | 93.3 | 93.3 | 93.3 | 93.0 | 92.7 | 93.12 |
| 5 | Sn | $Na_2SnO_3$ | .0063 | I | 94.8 | 94.7 | 94.7 | 94.5 | 94.3 | 94.60 |
| 6 | Sb | $KSbO \cdot C_4H_4O_6$ | .00416 | I | 94.4 | 94.3 | 94.0 | 93.7 | 93.2 | 93.92 |
| 7 | La | $La_2(SO_4)_3$ | .00247 | II | 94.9 | 94.7 | 94.7 | 94.5 | 94.3 | 94.62 |
| 8 | Er | $Er_2(SO_4)_3$ | .00437 | II | 94.7 | 94.4 | 94.4 | 94.2 | 94.0 | 94.34 |
| 9 | W | $Na_2WO_4$ | .00793 | I | 94.4 | 94.2 | 93.9 | 93.7 | 93.2 | 93.84 |
| 10 | Pt | $PtCl_4$ | .005 | II | 93.7 | 93.5 | 93.3 | 93.0 | 92.7 | 93.24 |
| 11 | Au | $AuCl_3$ | .001 | II | 94.0 | 93.8 | 93.8 | 93.5 | 93.3 | 93.68 |
| 12 | Th | $Th(SO_4)_2$ | .00606 | II | 94.7 | 94.4 | 94.2 | 94.1 | 93.8 | 94.24 |

FIG. 3

TABLE B

| | Untreated Pigment | Treated Pigment |
|---|---|---|
| Tinting Strength | 1250 | 1250 |
| Total Brightness | 93% | 93% |
| Reflectance Color Tone | Reddish | Blue Gray |
| Crystallinity | Anatase | Anatase |
| pH Value | 7.3 | 7.3 |
| Oil Absorption (Grams Linseed Oil Absorbed by 100 Grams Pigment) | 22.6 | 22.6 |

INVENTORS
WILLIS F. WASHBURN, ROY DAHLSTROM, ANDREW T. McCORD
BY
ATTORNEYS

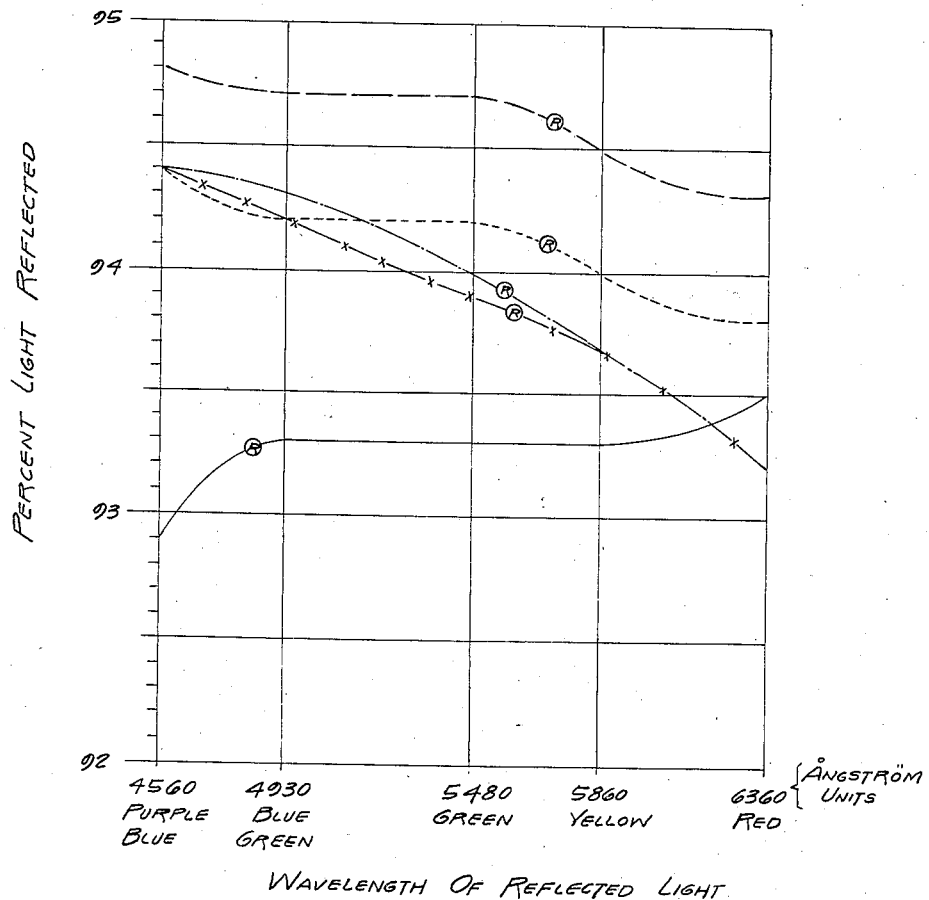

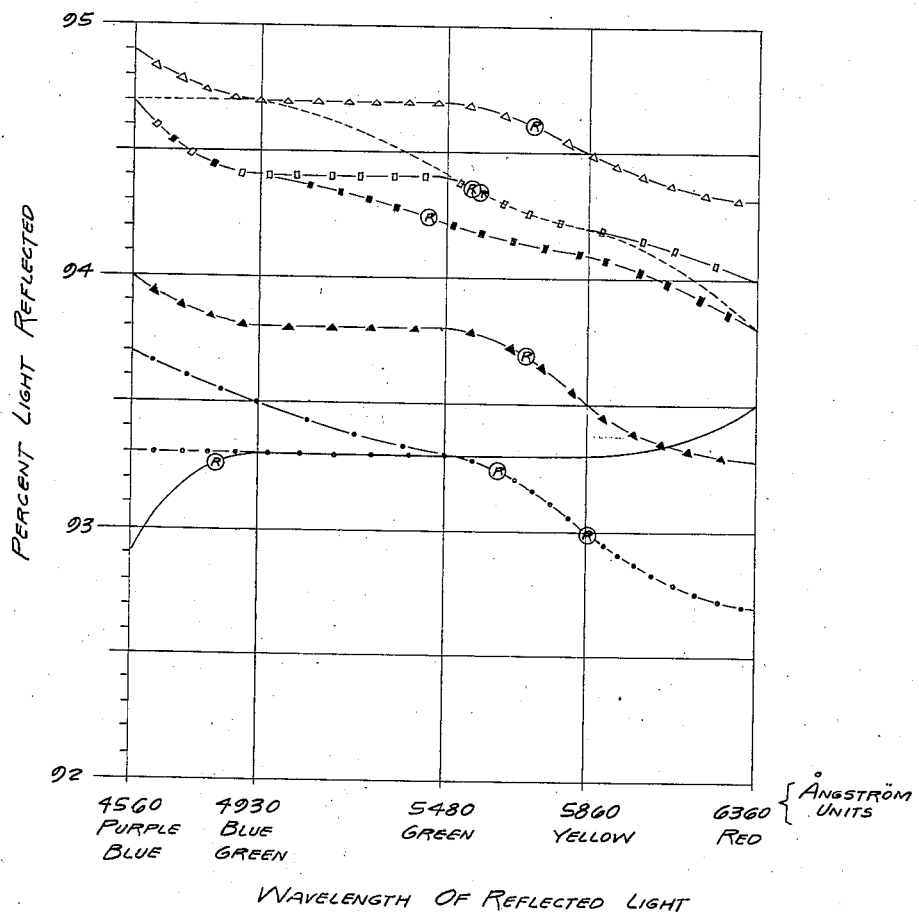

UNITED STATES PATENT OFFICE 2,166,082

WHITE TITANIUM PIGMENT AND METHOD OF PREPARING THE SAME

Willis F. Washburn, Roy Dahlstrom, and Andrew T. McCord, Metuchen, N. J., assignors, by mesne assignments, to National Lead Company, New York, N. Y., a corporation of New Jersey Application August 26, 1936, Serial No. 98,082

13 Claims. (Cl. 134—58)

This invention relates to white titanium pigments and to processes of their manufacture. It has equal reference to white titanium pigments consisting essentially of pure titanium dioxide and to white composite titanium pigments in which titanium dioxide is intimately associated with an extender, such as barium sulfate, calcium sulfate, asbestine, etc.

The adjective "white" as applied to pigments is a more or less relative term. A pigment which could be scientifically regarded as white would be one which would reflect all wavelengths of the visible spectrum with equal intensity. The so-called white pigments of commerce when subjected to scientific inspection are found not to be pure white, but to possess characteristic color tones which are not readily discernible to the average observer. To the eye of a trained pigment technologist, however, these characteristic color tones are readily apparent and it is possible, by means of a light reflectance analysis, to evaluate qualitatively as well as quantitatively the color tone of a commercial pigment. This color tone is sometimes referred to in the trade as an "undertone", a "tint", or even as a "subordinate color". The term should not be confused with distinctive colors characterizing colored pigments.

A light reflectance analysis is a measure, usually expressed as percent, of the total incident light reflected by a particular substance, for example, a white pigment, at several selected wavelengths within the visible spectrum. A pure white substance will give the same values at all wavelengths and may be graphically expressed on a chart the ordinates of which are percent light reflected and the abscissae wavelengths in Angström units as a straight line parallel to the abscissae near the top of the chart. White pigments which possess characteristic color tones, when similarly examined, will give slightly higher values at certain wavelengths corresponding to their particular color tone. When graphically expressed the values obtained for such pigments will be represented by curved or sloping lines, the high points of which will be found at the wavelengths corresponding to the particular color tone of the pigment.

The average of the values obtained for any pigment is regarded as the average total light reflected to all wavelengths and, in pigment technology, is referred to as the "brightness" of the pigment. For a pure white pigment the light reflected at any wave-length will not be greater than the average of the light reflected at all wavelengths of the visible spectrum. On the other hand, a white pigment having a characteristic color tone will show values some of which will be slightly higher, that is, of slightly increased intensity, than the average, while other values will be slightly lower than the average. The depth of color of the pigment will be roughly proportional to the difference between the light reflected at the highest point and the average of the light reflected at all points of the spectrum. In general, if the highest or lowest point on the curve of light reflectance is considerably removed from average total light reflected, the pigment will be deeply colored.

By using light reflectance data, we are able to define in exact terms, the tone, the depth of tone and the brightness of a pigment. In selecting this system for identifying and evaluating the tone of pigments we have been guided by the "Handbook of Colorimetry", prepared under the direction of Professor Arthur C. Hardy, and published in 1936 by the Massachusetts Institute of Technology.

The characteristic color tone of a white pigment may be the result of one or more factors which include the source of raw materials employed in the manufacture of the pigment, conditions of manufacture, impurities present in the final product, etc. Inasmuch as the characteristic color tone of a pigment is related to the optical property of that pigment to reflect the light of one or more wavelengths of the spectrum with slightly greater intensity than the average reflectance of all wavelengths we have used the expressions "color tone" and "characteristic color tone" to describe white pigments which when subjected to a light reflectance analysis, exhibit the property of reflecting certain wavelengths of the spectrum with slightly increased intensity above the average of total light reflected. Thus, we may speak of a white pigment as possessing a yellow tone or alternatively as possessing a characteristic yellow tone, meaning thereby that the pigment will reflect the wavelengths corresponding to yellow with slightly increased intensity above the average of light reflected at all wavelengths. As heretofore stated these color tones are rarely discernible to the untrained eye, although they may be detected by the trained technologist.

White pigments having a particular characteristic color tone are more suitable for certain industrial applications than other white pigments having a different characteristic color tone, and the desired color tone is determined more or less by the use to which the pigment is to be put. For example, in the manufacture of wrapping paper and the like, a pigment having a characteristic yellow tone may be preferred. On the other hand, a characteristic yellow or red tone of a pigment is enhanced by the yellow and red colors of most vehicles used in the manufacture of paints, varnishes and other surface coating compositions. Consequently, the present practice in the manufacture of surface coating compositions is to demand a white pigment having a blue-gray tone which overcomes or nullifies the color of the vehicle and yields a surface coating having the appearance of pure white.

The preparation of white titanium pigments possessing predetermined desired color tones, while retaining all other essential pigment qualities is a problem which has long confronted the pigment industry. Prior to our invention we are not aware of any methods by which this problem was satisfactorily solved. It has, of course, been a practice of long standing to add to an undesirably discolored white pigment a small amount of a colored pigment to neutralize or, in the language of the colorist "to complement" the undesirable discoloration. Such practice is simply a mechanical mixing of two colored materials to produce a mixture having a neutral tone of much reduced brightness. That is to say, the average of all light reflected by such mixtures is always considerably lower than that of the original, slightly discolored pigments. As will subsequently be shown, the white titanium pigments of our invention are not simple mixtures. Furthermore, the brightness of white titanium pigments prepared according to the methods of our invention is not materially altered.

There has also been suggested several methods for preparing colored pigments by chemical combination of a white pigment, for instance, titanium dioxide, with another chemical compound. One such method is suggested in U. S. Patent No. 1,969,061, which describes a method of chemically combining titanium dioxide with cobalt to form a greenish pigment. Such methods, as distinguished from our invention, are not directed to the manufacture of white pigments. The pigments obtained therefrom have greatly reduced brightness as compared with the original titanium dioxide and in other ways possesses altered pigment qualities.

Thus, one of the objects of the present invention is the preparation (process and product) of white titanium pigments which exhibit when examined spectrophotometrically a reflectance of slightly increased intensity at spectral wavelengths corresponding to a desired color tone above the average of total light reflected at all spectral wavelengths without substantially diminishing said average total reflectance and without adversely affecting other essential pigment qualities. Somewhat differently expressed, one of the objects of the invention is the preparation of white titanium pigments possessing predetermined desired color tones without substantial diminution of the brightness of the white titanium pigment and without adversely affecting the other essential pigment qualities.

The essential pigment qualities just referred to. it will be understood by those skilled in the art, vary somewhat with the use to which the pigment is to be put. In all cases it is essential that the pigment have tinting strength or covering power approaching the maximum, a substantial uniformity of particle size distribution, and a high average total light reflectance herein termed "brightness". Where the pigment is intended for use in the preparation of surface coating compositions, it is advantageous that it be characterized by a good miscibility and resistance to chalking and fading and have a high degree of durability when incorporated in surface coating compositions and an oil absorption and pH value as required by the particular type of surface coating composition in which the pigment is incorporated. Pigments formed in accordance with this invention are characterized not only by the broad essentials recited for general utility of the pigment, but also by the additional qualities advantageous in the use of the pigment in surface coating compositions. The latter qualities, however, are not to be considered as requisite to the term "essential" as broadly applied in the following description of the invention and in the claims appended hereto.

We have discovered that a desired tone can be imparted to white titanium pigments by a minute critically limited amount of a light reflectance controlling agent added to the pigment constituents in the process of manufacture of the pigment and operatively associated with the pigment particles in the final product in such manner that the desired color tone is produced by the optical properties of the light reflectance controlling agent in its relation to the optical properties of the pigment particles, which optical relationship remains constant upon the addition of other materials with which the pigment is to be associated in its various commercial uses; for example, film-forming vehicles, materials used in the manufacture of artificial silk, rubber products, filled or coated paper, and the like.

Thus, our present invention, when carried out in accordance with the directions herein set forth, will produce white titanium pigments having a desired color tone, the intensity of which expressed in terms of light reflectance will be only slightly higher than the average total reflection.

Titanium pigment materials, upon which our invention is to be practiced, quite frequently are found to yield slightly discolored white titanium pigments when processed according to the usual prior art methods. This discoloration may or may not be obvious before the process of preparation has been completed. It may be due to one or more factors, including the raw materials employed in the process of manufacture, the conditions of manufacture, impurities which become associated with the pigment constituents in the course of manufacture, and in certain cases to unknown factors.

Thus, in the manufacture of titanium pigments, whether they be substantially pure titanium dioxide or of the composite type, the raw material, for example, certain ilmenites tends to yield, in spite of great care in manufacture, undesirably discolored pigments. This discoloration is usually of a reddish or yellowish hue and appears to be associated with impurities present in the final product. Such pigments have been found to be commercially objectionable for the manufacture of paints, varnishes and other surface coating compositions. This objection has been so pronounced as to render unprofitable the use of certain ilmenites in the manufacture of titanium pigments for paint purposes where whiteness is demanded. Efforts to overcome the undesirable discoloration by mechanical mixing with a small amount of a pigment of complementary color are of no avail because of the resultant great reduction in brightness. Exhaustive washing of the pigment prior to calcination has similarly failed to eliminate the discoloration.

One of the objects of our present invention is to overcome; to correct; to nullify the undesirable discoloration without materially reducing the brightness of the resultant titanium pigments and without adversely affecting the essential pigment qualities. In fact, in many instances the brightness or average total reflectances is actually raised by the light reflectance controlling agent which imparts the desired reflectance color tone.

The depth of the slight discoloration which is associated with white titanium pigments as above noted is often considerably increased when such discolored white titanium pigments are exposed to actinic light rays. Such white titanium pigments which are sensitive to actinic rays are referred to as exhibiting photosensitivity, because it is believed that the result of this discoloration is due to photochemical changes.

An outstanding illustration of a photosensitive white titanium pigment is titanium dioxide prepared from certain ilmenite ores which tend to impart a reddish or yellowish red discoloration. Upon exposure to actinic rays for even a short time such titanium dioxide develops a discoloration, the depth of which is considerably more than that present prior to the exposure to the actinic rays.

By means of our present invention, white titanium pigments prepared in accordance therewith are found to be stable with respect to the action of actinic rays; that is to say, they are stable with respect to photo-chemical changes.

Thus, another object of our invention is the preparation (process and product) of white titanium pigments stabilized against the action of actinic rays.

Further objects of the invention will become apparent as this description of our invention progresses.

In the examples subsequently furnished we will, for the sake of convenience, illustrate the application of our invention to the manufacture of titanium pigments having a desired blue-gray tone suitable for the use in the manufacture of paints, varnishes and the like and of the products resulting from such application.

The manufacture of white titanium pigments according to our invention and the improved results obtained therefrom are shown by the drawings, in which:—

Figure 1 is a flow-sheet representing a general process for the manufacture of titanium dioxide;

Figure 2, Table A, is a tabulation of light reflectance data obtained from eleven pigments prepared according to our invention compared with similar data obtained from an untreated sample;

Figure 3, Table B, is a comparison of the essential pigment properties of a sample of titanium dioxide prepared according to our invention as compared with those of an untreated sample;

Figure 4 is a chart, the ordinates of which are percent light reflected, the abscissae of which are wavelengths in Ångström units, on which has been plotted curves of the light reflectance data given in Figure 2, Table A, for light reflectance controlling agents classified in Group I;

Figure 5 is a chart similar to Figure 3 on which has been plotted curves of the light reflectance data given in Figure 2, Table A, for light reflectance controlling agents classified in Group II.

In the production of white titanium pigments having a blue-gray tone, we have found that various metals in minute quantities within critical limits may be employed as light reflectance controlling agents and, further, that such metals may be introduced during the process of manufacturing the pigment in a wide variety of chemical and physical forms.

Titanium pigments are manufactured at the present time by a process which may be broadly described as follows:

Ground ilmenite ore is mixed with sulfuric acid and water to bring about a reaction which results in the formation of a cake consisting of water-soluble iron and titanium sulfates. This cake is dissolved in water or weak sulfuric acid, the solution is then subjected to a reducing treatment, clarified and subjected to low temperature crystallization to remove partly the ferrous sulfate present. The clarified solution is then concentrated to a predetermined titanium content, after which it is introduced into a hydrolysis and precipitating tank and subjected to thermal hydrolysis. When the titanium has been largely precipitated as hydrate, it is separated from the acid hydrolysis mother-liquor and subjected to an exhaustive filtration and washing treatment, designed to eliminate as much of the discoloring impurities which may be present as is possible. After the filtration the hydrous titanium oxide is a practically pure white material containing adsorbed or combined sulfuric acid and water. It is then fed to the calciner and subjected to a predetermined temperature, usually between 850° C. and 1000° C. to develop crystalline structure and pigment properties. It is during this calcination that the pigment usually assumes an undesirable discoloration. The calcined material is then pulverized in order to break down aggregates formed during the calcination, thus reducing it to the fine particle size which characterizes the pigment.

The general process of manufacture of titanium dioxide pigments above described is illustrated in the flow sheet, Figure 1. That process will be employed hereinafter as the basis for illustrating the practice of our invention and the light reflectance controlling agent employed in the practice of our invention will be illustrated as added to that process between or coincident with certain steps thereof. This method of illustration is for convenience and is not limitative of the scope of the invention. It is well recognized in the art that the process illustrated in Figure 1 is subject to various refinements and changes in manufacturing details, but it is not deemed essential to an understanding of our invention to incorporate such refinements and manufacturing details herein. Exhaustive experiment has shown that they play no material part either in the method of practicing our invention or in the desired color tone characterizing our novel pigments.

As above pointed out and as will later be seen in detail, our invention is applicable to composite titanium pigments as well as to titanium dioxide pigments in which no extenders are employed. The foregoing general description of the manufacture of titanium dioxide pigments and the flow sheet is illustrative of the general process commonly employed in the manufacture of composite pigments if modified to include the introduction of the extender to the titanium sulphate solution prior to hydrolysis or to the hydrous titanium oxide prior to calcination. It is the process thus modified which will be employed in illustrating the use of our invention in connection with composite pigments.

In the manufacture of white titanium pigments having a predetermined desired blue-gray tone, it is preferable to add the light reflectance controlling agent to the hydrous titanium oxide during or after the filtration and washing treatment. It is convenient to add the light reflectance controlling agent in the form of a water soluble salt just prior to the completion filtration operation. However, because of the minute quantities which are effective in producing the improved results of our invention and depending on the tendency of the light reflectance controlling agents to carry through the process in intimate association with the titanium constituent of the material being processed, the agent may be added in a substantially insoluble form at any stage of the process prior to calcination without departing from the scope of our invention.

As illustrating the light reflectance controlling agents which are particularly applicable for imparting a desired blue-gray tone to white titanium pigments, we note the following: yttrium, molybdenum, palladium, tin, antimony, lanthanum, erbium, tungsten, platinum, gold, and thorium.

These eleven metals may be conveniently grouped depending upon the character of the compounds which have been found to be particularly advantageous in carrying out the process of our invention, as follows:

Group I.—Salts in which the elements molybdenum, palladium, tin, antimony, tungsten, platinum and gold occur as the characteristic constituent of an acid radical. As examples of the compounds of the light reflectance controlling agents classified in this group, we may mention ammonium molybdate, potassium palladinate, sodium stannate, potassium antimonate, calcium tungstate.

Group II.—Salts in which the elements yttrium, molybdenum, palladium, antimony, lanthanum, erbium, tungsten, platinum, gold and thorium occur combined with the radical of an organic or inorganic acid such as the halogen acids, sulphuric acid, tartaric acid, oxalic acid, etc. As examples of the compounds of the light reflectance controlling agents classified in this group, we may mention yttrium nitrate, molybdic chloride, palladium chloride, antimony tartrate, lanthanum sulphate, erbium sulphate, tungstic chloride, platinic chloride and auric chloride, and thorium sulphate.

We do not intend to limit ourselves to the use of our novel light reflectance controlling agents in the form of the compounds classified above. This classification will serve as a guide to the selection of a convenient form of the light reflectance controlling agent which may be employed most economically in the practice of our invention. Improved results will be secured by the use of the light reflectance controlling agent chemically or physically combined with other elements or materials which neither interfere with the smooth operation of the process nor adversely affect the finished pigment provided such combinations be added to process of manufacture of the pigment at a stage where it can become intimately associated with the titanium constituent and can carry through the process in association therewith. For example, we have attained satisfactory results by adding a small amount of scheelite, a tungsten ore, to ground ilmenite prior to the reaction of the ilmenite with sulfuric acid in the first step of the process.

As stated above, our novel light reflectance controlling agents are effective in minute quantities but there are critical limits above referred to as to the quantity of light reflectance controlling agent to be added. The critical limits cannot arbitrarily be set forth for all cases but are determined according to the following considerations: (1) The composition of the raw material from which the pigment is to be made: if an ilmenite is employed which would yield a white pigment possessing a discoloration of relatively high intensity a correspondingly larger quantity of the light reflectance controlling agent may be required to nullify this discoloration. (2) The brightness and other pigment qualities of the pigment which must be preserved: a sufficient quantity of the light reflectance controlling agent must be added to correct or nullify the undesirable discoloration and this quantity must be kept within the limits requisite for the maintenance of high brightness and for the preservation of other essential pigment qualities. (3) The relative efficiency of the light reflectance controlling agent in the form employed: depending upon whether the light reflectance controlling agent is employed in the form of a compound substantially soluble in water or aqueous solutions of mineral acids, or substantially insoluble therein it may be necessary to vary the amounts employed to a slight degree within the critical limits.

As more specifically illustrating our invention the eight following examples of the formation of a titanium pigment particularly suitable for use in the preparing of surface coating compositions are given, this being the use which imposes the most stringent requirements upon the pigment. In each of the examples, as stated above, the general process of the flow sheet, Figure 1, modified by the specified addition of an extender when a composite pigment is to be formed, will be understood to be employed with the light reflectance controlling agent added to the process as specified in the example. In each of the examples the ilmenite employed is a titaniferous ore analyzing about 50% $TiO_2$ and yielding a photosensitive white titanium dioxide having a reddish discoloration on calcination to crystalline form. The calcination treatment employed in these examples was that used in the commercial production of titanium pigments where the hydrous titanium oxide, or composite pigment pulp, is fed to a calciner wherein the material is subjected to temperatures varying between 850° C. and 1000° C. until the absorbed or combined sulphuric acid and water are eliminated and the titanium dioxide fully converted to crystalline form, after which the calcined material is pulverized prior to marketing.

EXAMPLE No. 1

*Illustrating the addition of the light reflectance controlling agent at the filtration stage*

A sufficient quantity of water was added to an amount of hydrous titanium oxide containing 1000 kilograms of titanium dioxide, calculated as $TiO_2$, to form a free-flowing slurry. The hydrous titanium oxide had been previously washed. To the free-flowing slurry of hydrous titanium oxide (Ex. 1, Fig. 1) was added a quantity of an aqueous solution of sodium tungstate containing about 80 grams of tungsten and the whole stirred for about one hour after which the solids were separated, calcined and pulverized, all as set forth above in describing the flow sheet.

The resultant white titanium dioxide pigment was found to possess the desired blue-gray reflectance tone and the essential pigment qualities were not adversely affected. Furthermore, it possessed the characteristics hereinabove set forth as particularly advantageous in pigments for use in the preparation of surface coatings.

The data given in Table A, Figure 2 relative to the light reflectance properties of the pigments tested were obtained in the well-known manner by means of spectrophotometric analysis according to the method which is recommended by Committee D—1 of the American Society for Testing Materials identified as Method D-307-30, and described along with other color and light reflectance analysis methods in "Physical and Chemical Examinations of Paints, Varnishes, Lacquers and Colors", by H. A. Gardner, 7th edition, 1935, page 129, et. seq. The results given above are expressed as percent light reflected at several wavelengths within the spectrum expressed in Ångström units, as compared with the light reflected by a standard block of magnesium carbonate having a known reflectance factor.

The data given in Table A of Figure 2 are graphically shown in Figures 4 and 5 hereof. In the charts comprising Figures 4 and 5 the percent of light reflected as obtained by the method of the American Society for Testing materials, supra, is taken as ordinates and the wavelength in Ångström units as the abscissae. In Figure 4 are plotted the values obtained with the use of light reflectance controlling agents classified in Group I as compared with an untreated pigment. In Figure 5 are plotted the values obtained with the use of the light reflectance controlling agents classified in Group II as compared with an untreated pigment. The significance of the shape of the curves shown on these figures in relation to applicants' invention and the white pigments obtained therefrom will later be shown.

As stated above we are not limited to the form of the light reflectance controlling agent employed or, in adding the said agent, to any particular stage in the process of manufacture of the white pigment. The following examples illustrate various alternative procedures:

EXAMPLE No. 2

*Illustrating the addition of the light reflectance controlling agent to the ilmenite prior to digestion*

To one (1) ton of the ilmenite above specified a sufficient quantity of scheelite was added to furnish about one pound of $WO_3$.

The process of manufacturing the titanium dioxide pigment was then carried out as indicated in Figure 1 and the paragraph introductory to these examples.

The resulting white titanium dioxide had a desired blue-gray reflectance tone. The brightness and other pigment qualities were similar to those of pigment No. 9 shown in Figure 2, Table A and Figure 4.

EXAMPLE No. 3

*Illustrating the addition of the light reflectance controlling agent to the titanium solution prior to hydrolysis*

To 10,000 pounds of a titanium sulfate solution prepared by the use of the process shown in Figure 1 and analyzing 10% $TiO_2$, a sufficient quantity of an aqueous solution of potassium molybdate was added to contain the equivalent of two (2) pounds of $MoO_3$.

The solution was then further treated as shown in Figure 1 and described in the paragraph introductory to these examples.

The resulting white titanium dioxide had a desired blue-gray reflectance tone and possessed brightness and other pigment qualities, similar to those possessed by pigment No. 3 shown in Figure 2, Table A and Figure 4.

The preparation of solutions of alkali metal compounds of the light reflectance controlling agents of Group I and their employment in the preparation of a white titanium dioxide pigment, is illustrated by the following example:

EXAMPLE No. 4

To a solution containing 20 pounds of potassium carbonate, one-tenth ($\frac{1}{10}$) of a pound of tungstic acid was added and the whole stirred until the tungstic acid was dissolved. The resulting solution was added to 6,660 pounds of washed hydrous titanium oxide prepared in accordance with the process of Figure 1 and containing 2000 pounds of $TiO_2$ by analysis. After thorough mixing, the treated hydrous titanium oxide was further processed as shown in Figure 1 and described in the paragraph introductory to these examples.

A white titanium dioxide having a blue-gray reflectance tone of slightly increased intensity above the average was obtained. The average total reflectance and other pigment qualities were similar to those of pigment No. 9 shown in Figure 2, Table A and Figure 4.

The application of our invention to the manufacture of white composite titanium pigments is illustrated by the following examples:

EXAMPLE No. 5

*Preparation of co-precipitated composite pigments*

A titanium sulfate solution prepared in accordance with the process of Figure 1 to which has been added blanc fixe as herein above referred to, was subjected to the specified hydrolysis. The proportions were so regulated as to obtain a composite precipitate weighing 20,000 pounds and analyzing 30% solids of which 25% was $TiO_2$ and 75% was $BaSO_4$. To this composite, after washing, was added a quantity of gold chloride, $AuCl_3$, equivalent to 0.06 pound of Au. The treated composite was further processed as shown in Figure 1 and described in the paragraph introductory to these examples.

The resulting pigment was a white titanium dioxide-barium sulfate composite pigment having a brightness and other pigment qualities practically identical with an untreated composite formed from the same ore, and possessing a desirable blue-gray reflectance tone.

EXAMPLE No. 6

*Preparation of composite pigments by mechanically mixing the pigment constituents*

One thousand kilograms of hydrous titanium oxide prepared in accordance with the process of Figure 1 were treated with sodium tungstate as described in Example No. 1, were thoroughly and intimately mixed with three thousand kilograms of blanc fixe. The mixture was then processed further as shown in Figure 1 and described in the paragraph introductory to these examples.

The resulting composite titanium pigment resembled in brightness, pigment qualities and the blue-gray reflectance tone the product obtained from the practice of Example No. 5.

The light reflectance controlling agent may suitably be added to the process of manufacturing white titanium pigments with the concentrated sulfuric acid used for digesting the ilmenite or with the weak acid used for dissolving the digestion cake. Such procedures are illustrated by the following examples:

EXAMPLE No. 7

*Addition of the light reflectance controlling agent with the concentrated sulfuric acid*

The weak sulfuric acid from several operations according to Example No. 3 was clarified and reconcentrated in the well-known manner. It contained that portion of the molybdenum which had not become associated with the titanium in light reflectance controlling relationship.

One ton of the ilmenite above specified was mixed with two tons of the reconcentrated sulfuric acid in which had been dissolved an additional quantity of potassium molybdate to increase the content in the two tons to two pounds, calculated as $MoO_3$.

The digestion of this starting mixture and other subsequent steps in the process were carried out as shown in Figure 1 and the paragraph introductory to these examples.

The resulting white titanium dioxide resembled brightness, pigment qualities and the blue-gray reflectance tone the product obtained from the practice of Example No. 3.

EXAMPLE No. 8

*Addition of the light reflectance controlling agent with the weak sulfuric acid employed for dissolving the digestion cake*

A digestion cake obtained by reacting one ton of the ilmenite above specified with two tons of chemically pure concentrated sulfuric acid was dissolved in the minimum requisite quantity of weak sulfuric acid mother-liquor containing molybdenum obtained from several operations conducted according to Example No. 3 above. To the solution so obtained was added an additional amount of potassium molybdate to increase the content of molybdenum to two pounds, calculated as $MoO_3$.

The resulting solution was clarified and subjected to the other subsequent steps of the process as shown in Figure 1 and described in the paragraph introductory to these examples.

The resulting white titanium dioxide resembled in brightness, pigment qualities and the blue-gray reflectance tone the products obtained from the practice of Examples No. 3 and No. 7.

The necessity of observing critical limits in the amount of light reflectance controlling agent to be added to the pigment constituent in the processing of the same to form a white pigment has been above stated in general terms. In the foregoing examples the critical amount added in specific instances is specifically illustrated. Exhaustive tests have resulted in determining the outside limits of the eleven light reflectance controlling agents above enumerated as being useful in the manufacture of white titanium pigment having a blue-gray reflectance tone as being substantially between 0.04 and 0.001%, calculated as metallic element on the basis of the titanium dioxide, $TiO_2$, in the finished pigment. It is believed that these critical limits appertaining to the eleven specified light reflectance controlling agents herein enumerated for use in the manufacture of white titanium pigments taken in connection with the directions hereinabove set forth in detail for the production of the said pigments having a predetermined reflectance tone characterized as above set forth, will enable those skilled in the art to ascertain readily the critical limits for other suitable light reflectance controlling agents.

The white titanium pigments obtained from the practice of our invention, according to the methods illustrated in Examples Nos. 2–8, do not differ in reflectance properties nor in other pigment qualities from the products obtained by practicing our invention according to the method illustrated in Example No. 1. Hence, we can now discuss the significance of the data given in Figure 2, Table A and Figures 4 and 5, and the relation of this data to our invention and the white pigments obtained from the practice thereof.

Pigment No. 1, which appears on both Figures Nos. 4 and 5, is a pigment prepared without the use of a light reflectance controlling agent. Note that the slope of the curve ascends from left (the wavelengths of purple-blue) to right (the wavelengths of red). This pigment exhibits a reddish discoloration. Note also how the slope of the curves of pigments Nos. 2–12 prepared according to our invention has been completely reversed, descending from left to right. On all curves the point R represents the average total reflectance of the pigment. The point for the reflectance at the wavelength of 4560 Ångström units (purple-blue) for all white pigments prepared according to our invention is slightly higher than the point R. Such pigments which exhibit only a slightly increased reflectance at 4560 Ångström units over the average total reflectance when visually examined do not possess a pronounced or readily discernible purple-blue tone. The reason for this is that there is not sufficient difference between the reflection at the wavelengths corresponding to purple-blue and the reflection at wavelengths corresponding to the remainder of the spectral colors. Consequently, any one of the white pigments prepared as specified, could not be accurately described as possesing a purple-blue tone although under spectrophotometric analysis it will be found to reflect light corresponding to the wavelengths of purple-blue with slightly increased intensity as compared with the light reflected at wavelengths corresponding to the remainder of the spectral colors. They do, however, possess a distinctly visible tone which the trained pigment technologist designates as purple-blue. Accordingly, throughout this description and in the claims appended hereto wherein we have used the term "blue-gray", that term is descriptive of the color tone of white titanium pigments which, subjected to a spectrophotometric analysis have a slightly increased reflectance above the average of total light reflectance at the wavelengths corresponding to purple-blue, or, all which, when examined by the art of a trained technologist, appears to possess a blue-gray color tone. From these curves it will be clearly seen that our invention is directed to influence the physical characteristics of the individual white titanium pigment in one particular aspect: the property of light reflectance.

In this illustration we have made use of a process involving the hydrolytic precipitation of hydrous titanium oxide from titanium sulphate solutions. It will be understood, of course, that our invention is equally applicable for the preparation of white titanium pigments resulting from the calcination of hydrous titanium oxide obtained in ways other than from titanium sulphate solutions. For example, our invention may be employed in processes which utilized titanium tetrachloride solutions as a basis for obtaining hydrous titanium oxide. Furthermore, in the specific illustrations given we have chosen, for the sake of simplicity, to employ a single light reflectance controlling agent in the manufacture of the desired pigment. However, the improved results of our invention may be attained by the use of two or more light reflectance controlling agents in the manufacture of a single pigment. Thus, mechanical mixtures of light reflectance agents may be used or materials, such as naturally occurring minerals in which there is present two or more of the light reflectance controlling agents. Our invention is, therefore, not limited to the particular process by which the white titanium pigment material is prepared nor to the use of a single light reflectance controlling agent as distinguished from the use of a plurality of light reflectance controlling agents.

In Figure 3, Table B, we have tabulated data as to the efficiency and advantageous pigment properties which are not adversely affected by the use of our invention. This data was obtained from the examination of titanium pigments prepared according to the specific processes herein above set forth for the preparation of titanium pigments Nos. 1 to 12, the light reflectance properties which are described in Figure 2, Table A, and Figures 4 and 5. The data given appertains to the properties of tinting strength, brightness, reflectance color tone, crystallinity pH value and oil absorption. The other properties of these pigments described in Figure 3, Table B, for example; miscibility with vehicles, particle size distribution, and resistance to chalking, were the same in the treated sample and in the untreated sample. A study of this table confirms the foregoing statements made herein that the addition of the light reflectance controlling agent does not adversely affect the essential and advantageous properties of the white pigments with which such agents may be associated. The table is simple and self-explanatory.

The use of a light reflectance controlling agent may accomplish one or more of several objects: (1) it may be employed to impart to a pure white titanium pigment (i. e., one having a straight line reflectance curve all points of which will be equal to the average total reflectance) a predetermined reflectance color tone in order to render that pigment more adaptable for certain specific industrial applications (2) it may be employed to nullify or correct a slight undesirable discoloration which develops in the preparation of certain white titanium pigments, for example, in the calcination of titanium dioxide derived from certain ilmenites: (3) it may be employed to render white titanium pigments which are photosensitive (i. e., develop an undesirable discoloration upon exposure to actinic rays) stable against the actinic rays.

We have used the term "in intimate association and operative relation" to denote the union which exists between the light reflectance controlling agent and the pigment particles. It will be appreciated that, because of the extremely small amounts of the light reflectance controlling agent employed, we have not been able to ascertain the exact nature of the association which exists between it and the pigment particles.

Furthermore, in the appended claims wherein one or more of the light reflectance controlling agents hereinabove enumerated are specifically included such light reflectance controlling agent or agents are identified by their metallic constituents, it being understood that by such identification the form of the light reflectance controlling agent existing in the product whether as an uncombined metal, compound, alloy, etc., is implied, and in the process the form in which the metal is initially employed or to which it is altered in the course of the process.

The foregoing description has been presented for clearness of understanding and no undue limitations should be deduced therefrom but the appended claims should be interpreted as broadly as possible in view of the prior art.

We claim:

1. A substantially white titanium pigment having a blue-gray color tone, comprising finely divided calcined particles of titanium dioxide and one or more light reflectance controlling agents selected from the group consisting of yttrium, molybdenum, palladium, tin, antimony, lanthanum, erbium, tungsten, platinum, gold and thorium in a predetermined amount between 0.001 percent. and 0.04 percent. based on the weight of the titanium dioxide in intimate association and operative relation therewith, said light reflectance controlling agents having the property of imparting to the said titanium dioxide a blue-gray color tone, the said titanium pigment with the light reflectance controlling agents possessing the property of reflecting light of the relatively shorter wavelengths of the visible spectrum with slightly increased intensity over the average of total light reflected at all wavelengths and possessing a brightness not substantially lower than that of a similar but untreated white titanium pigment and essential pigment qualities not substantially inferior to the pigment qualities of the said untreated white titanium pigment, substantially as described.

2. A substantially white titanium pigment having a blue-gray color tone, comprising finely divided calcined particles of titanium dioxide and a predetermined amount of tungsten between 0.001 percent. and 0.04 percent. based on the weight of the titanium dioxide in intimate association and operative relation therewith, the tungsten having the property of imparting to the said titanium dioxide a blue-gray color tone, the said tungsten-containing titanium pigment possessing the property of reflecting light of the relatively shorter wavelengths of the visible spectrum with slightly increased intensity over the average of total light reflected at all wavelengths and possessing a brightness not substantially lower than that of a similar but untreated white titanium pigment and essential pigment qualities not substantially inferior to the pigment qualities of the said untreated white titanium pigment, substantially as described.

3. A substantially white titanium pigment having a blue-gray color tone, comprising finely divided calcined particles of titanium dioxide and a predetermined amount of molybdenum between 0.001 per cent. and 0.04 percent. biased on the weight of the titanium dioxide in intimate association and operative relation therewith, the molybdenum having the property of imparting to the said titanium dioxide a blue-gray color tone, the said molybdenum-containing titanium pigment possessing the property of reflecting light of the relatively shorter wavelengths of the visible spectrum with slightly increased intensity over the average of total light reflected at all wavelengths and possessing a brightness not substantially lower than that of a similar but untreated white titanium pigment and essential pigment qualities not substantially inferior to the pigment qualities of the said untreated white titanium pigment, substantially as described.

4. A substantially white titanium pigment having a blue-gray color tone, comprising finely divided calcined particles of titanium dioxide and a predetermined amount of antimony between 0.001 percent. and 0.04 percent. based on the weight of the titanium dioxide in intimate association and operative relation therewith, the antimony having the property of imparting to the said titanium dioxide a blue-gray color tone, the said antimony-containing titanium pigment possessing the property of reflecting light of the relatively shorter wavelengths of the visible spectrum with slightly increased intensity over the average of total light reflected at all wavelengths and possessing a brightness not substantially lower than that of a similar but untreated white titanium pigment and essential pigment qualities not substantially inferior to the pigment qualities of the said untreated white titanium pigment, substantially as described.

5. A substantially white composite titanium pigment having a blue-gray color tone, consisting of finely divided calcined particles of titanium dioxide, one or more light reflectance controlling agents selected from the group consisting of yttrium, molybdenum, palladium, tin, antimony, lanthanum, erbium, tungsten, platinum, gold and thorium in a predetermined amount between 0.001 percent and 0.04 percent, calculated as metallic element, based on the weight of the titanium dioxide in intimate association and operative relation therewith and an extender pigment, the said light reflectance controlling agent having the property of imparting to the said titanium dioxide a blue-gray color tone, the said white composite titanium pigment possessing the property of reflecting light of the relatively shorter wavelengths of the visible spectrum with slightly increased intensity over the average of total light reflected at all wavelengths and possessing a brightness not substantially lower than that of a similar but untreated white composite titanium pigment and essential pigment qualities not substantially inferior to the pigment qualities of the said untreated composite titanium pigment, substantially as described.

6. The process of manufacturing a titanium dioxide pigment which comprises decomposing a titaniferous ore to obtain the titanium values thereof in the form of a titanium salt solution, recovering the hydrous titanium oxide from the said solution, calcining the hydrous titanium oxide thus recovered, and during any stage of the process prior to calcination intimately mixing with the titanium pigment-forming material one or more light reflectance controlling agents selected from the group consisting of yttrium, molybdenum, palladium, tin, antimony, lanthanum, erbium, tungsten, platinum, gold and thorium in a predetermined amount between 0.001 percent and 0.04 percent calculated as metallic element based on the weight of the titanium constituent calculated as $TiO_2$, the calcination step including the calcining of the mixture of hydrous titanium oxide and the said light reflectance controlling agent or agents, whereby the particles of the light reflectance controlling agent or agents and the finished titanium dioxide particles are intimately associated in such operative relation that light of the relatively shorter wavelengths of the visible spectrum will be reflected with slightly increased intensity over the average of total light reflected at all wavelengths without substantially diminishing the brightness or adversely affecting the essential pigment qualities of the said titanium dioxide particles and the finished pigment will possess a blue-gray color tone.

7. Process as described in claim 6 wherein the light reflectance controlling agent employed is tungsten.

8. Process as described in claim 6 wherein the light reflectance controlling agent employed is molybdenum.

9. Process as described in claim 6 wherein the light reflectance controlling agent employed is antimony.

10. In a process of manufacturing a titanium dioxide pigment which includes the calcination of hydrous titanium oxide, the steps which consist in intimately mixing with the said hydrous titanium oxide one or more light reflectance controlling agents selected from the group consisting of yttrium, molybdenum, palladium, tin, antimony, lanthanum, erbium, tungsten, platinum, gold and thorium in a predetermined amount between 0.001 percent and 0.04 percent calculated as metallic element based on the weight of the titanium constituent calculated as $TiO_2$, and calcining the mixture thus obtained, whereby the particles of the light reflectance controlling agent or agents and the finished titanium dioxide particles are intimately associated in such operative relation that light of the relatively shorter wavelengths of the visible spectrum will be reflected with slightly increased intensity over the average total light reflected at all wavelengths without substantially diminishing the brightness or adversely affecting the essential pigment qualities of the said titanium dioxide particles and the finished pigment will possess a blue-gray color tone.

11. Process as described in claim 10 wherein the light reflectance controlling agent is tungsten.

12. Process as described in claim 10 wherein the light reflectance controlling agent is molybdenum.

13. Process as described in claim 10 wherein the light reflectance controlling agent is antimony.

WILLIS F. WASHBURN.
ROY DAHLSTROM.
ANDREW T. McCORD.